United States Patent [19]

Olds

[11] Patent Number: 5,412,389
[45] Date of Patent: May 2, 1995

[54] MULTIBEAM POSITION AMBIGUITY RESOLUTION

[75] Inventor: Keith A. Olds, Mesa, Ariz.

[73] Assignee: Motorola, Inc., Schaumburg, Ill.

[21] Appl. No.: 105,988

[22] Filed: Aug. 11, 1993

[51] Int. Cl.$^6$ .......................... G01S 5/02; G01C 21/00
[52] U.S. Cl. ..................................... 342/357; 364/449
[58] Field of Search ..................... 342/357, 450, 457; 364/449

[56] References Cited

U.S. PATENT DOCUMENTS

| | | | |
|---|---|---|---|
| 4,728,959 | 3/1988 | Maloney et al. | 342/457 |
| 4,797,677 | 1/1989 | MacDoran et al. | 342/352 |
| 4,860,352 | 8/1989 | Laurance et al. | 380/23 |
| 5,119,101 | 6/1992 | Barnard | 342/357 |
| 5,119,504 | 6/1992 | Durboraw, III | 455/54.1 |
| 5,177,489 | 1/1993 | Hatch | 342/357 |

OTHER PUBLICATIONS

"Emitter Location Accuracy Using TDOA and Differential Doppler" by Paul C. Chestnut from IEEE Transactions on Aerospace and Electronic Systems, Vol. AES-18, No. 2, Mar. 1982.

"Geolocation of Frequency-Hopping Transmitters via Satellite" by A. Sonnenschein and W. K. Hutchinson from Technical Report 900, Nov., 1990.

"Geolocation via Satellite: A Methodology and Error Analysis" by M. J. Shensa from Technical Report 1244, May 1988.

Primary Examiner—Gregory C. Issing
Attorney, Agent, or Firm—Robert M. Handy; Phillip E. Hall; Kevin K. Johanson

[57] ABSTRACT

A radio telecommunications/location system includes a number of locator satellites in low earth orbits. The satellites include multibeam antennas. Locatable subscriber units communicate with the satellites. A single subscriber unit communicates with a single satellite using electromagnetic signals so that measurement processors can obtain Doppler component, and propagation duration measurements of the signals. A location processor converts these measurements into a two-position location solution. The two-position solution includes an actual position and an image position. The actual position may be detected in some situations by identifying a cell within which communications take place. In other situations, the actual position may be distinguished from the image position by comparing signals received at the subscriber unit through antenna beams projected to the left of the satellite's ground track with signals received at the subscriber unit through antenna beams projected to the right of the satellite's ground track.

20 Claims, 9 Drawing Sheets

MULTIBEAM POSITION AMBIGUITY RESOLUTION

CROSS-REFERENCE TO RELATED APPLICATIONS

This application is related to commonly assigned United States Patent Applications:

"Radio Telecommunications System and Method with Adaptive Convergence Location Determination", by Keith Olds and Kristine Maine, Ser. No. 08/105,219;

"Position Ambiguity Resolution", by Stanley Attwood, Ser. No. 08/105,235;

"Geolocation Responsive Radio Telecommunication System and Method Therefor", by Kristine Maine, Keith Olds, and Gerald Davieau, Ser. No. 08/105,730; and "Location System and method with Acquistion of Accurate Location Parameters", by Kristine Maine, Keith Olds and Stanley Artwood, Ser. No. 08/105,227.

TECHNICAL FIELD OF THE INVENTION

The present invention relates generally to location determination systems. More specifically, the present invention relates to location determination systems in which measured location parameters yield a plurality of equally credible locations of which only one is actually correct and to radio telecommunications systems which employ such location determination systems.

BACKGROUND OF THE INVENTION

Prior art location determination systems, such as Global Positioning System (GPS), GLONASS, Loran, and the like, are known. Such systems rely, for the most part, on triangulation. In other words, these prior art location determination systems use two or more transmitters or receivers ("locators") located at distant positions. The locators are capable of transmitting or receiving signals to or from a locatable unit residing at a location to be determined. When given the locators' positions, the position of the locatable unit may be determined essentially by triangulation after measuring characteristics of the signals communicated between the locatable unit and the two locators.

Such prior art location determination systems achieve adequate performance for many different applications. However, they fail to provide an adequate solution for location determination in connection other applications, such as a substantially global radio telecommunications system that can provide communication services to substantially any point on or near the surface of the earth. Such a radio telecommunications system desirably operates with portable subscriber units. In order for subscriber units to have acceptable portability, they are desirably capable of low power battery operation, and they are desirably capable of transmitting and receiving electromagnetic signals through a relatively small antenna.

While subscriber units could be configured to incorporate components which take advantage of existing location determination systems, these components would substantially increase costs of the subscriber units. Moreover, relying on existing location determination systems could reduce reliability of a radio telecommunications system by introducing reliance upon an external system.

The techniques used by prior art location determination systems might possibly be incorporated into a radio telecommunications system, but the introduction of such techniques could seriously degrade communication services. For example, the requirement for two or more locators to be within view over the entire globe when combined with a global telecommunication capability, makes this approach undully cumbersome. While this requirement might be met by placing satellites in high or geosynchronous orbits around the earth, higher orbits place satellites further away from subscriber equipment on the earth. This larger distance causes the subscriber equipment to consume excessive power or incorporate larger antennas just to participate in communication services. Moreover, higher orbits require increased spectrum allocation to carry a given amount of communications because the allocated spectrum may be reused less frequently in a given area.

SUMMARY OF THE INVENTION

Accordingly, it is an advantage that the present invention provides an improved location determination system and method which are suitable for use in a radio telecommunications system and other applications.

Another advantage of the present invention is that locations for subscriber units are determined.

Another advantage is that the present invention may determine locations for subscriber units using no more that a single satellite which orbits the earth in a low earth orbit.

Another advantage is that the present invention uses a multibeam antenna for engaging in communications with respect to a plurality of signals that are processed to select an actual position for the locatable unit.

Another advantage is that the present invention distinguishes an actual position from an image position by comparing signals received through antenna beams projected on opposing sides of a distinguishing line of symmetry.

The above and other advantages of the present invention are carried out in one form by a method of distinguishing an actual position from an image position in a location determination system. The actual position is identified from first and second positions that are symmetrically located about a distinguishing line. The method calls for projecting a plurality of antenna beams in a plurality of diverse directions, wherein a first portion of the beams project on a first side of the distinguishing line and a second portion of the beams project on a second side of the distinguishing line. A signal transmitted through one of the beams is received. The one of the first and second positions which resides on the same side of the distinguishing line as the beam through which the signal was received is selected as the actual position.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
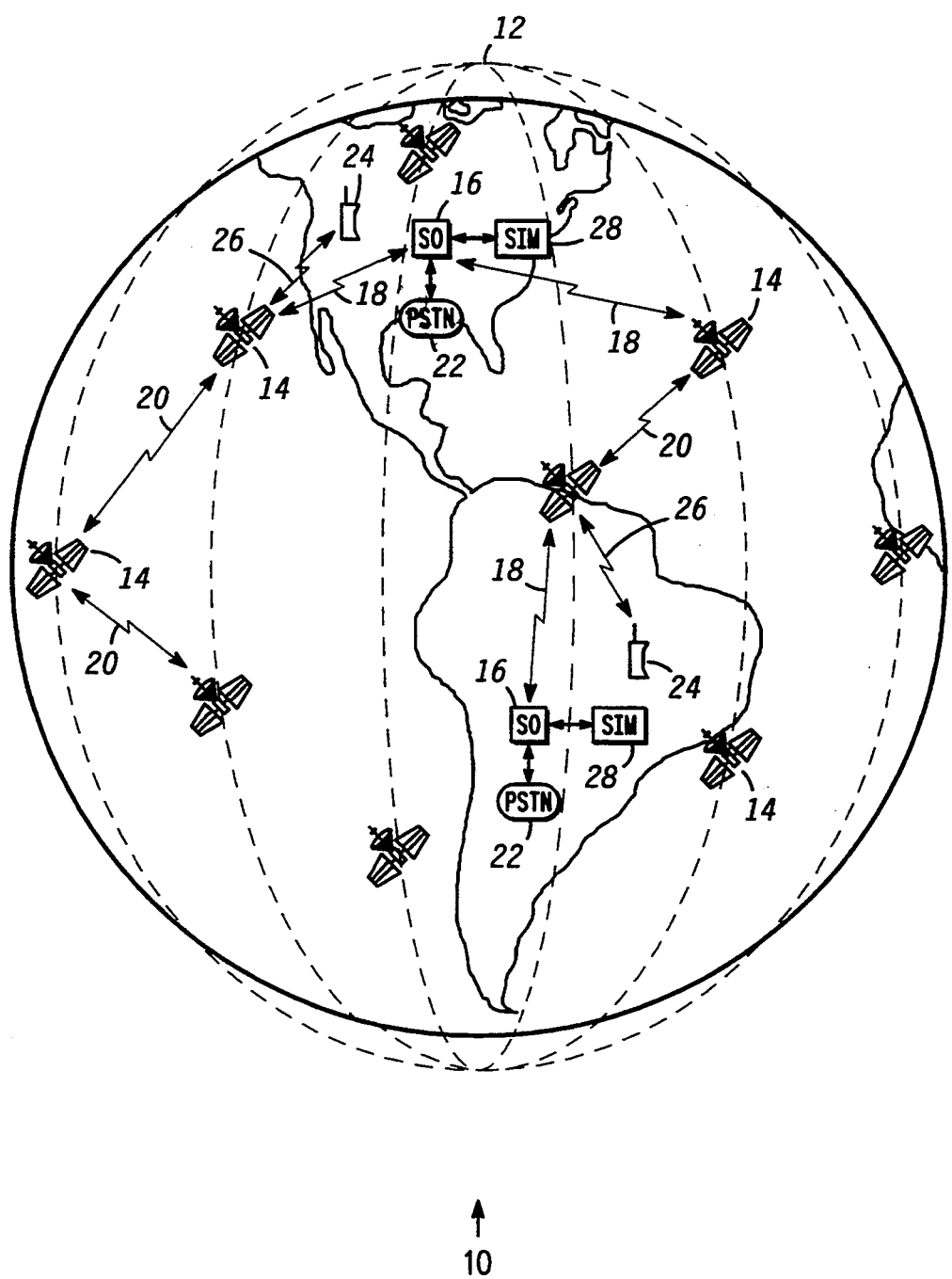
FIG. 1 shows a layout diagram of an environment within which a radio telecommunications system employing a location determination system may operate.

FIG. 1 shows a layout diagram of an environment within which a radio telecommunications/location system 10 operates. System 10 includes a constellation 12 consisting of several satellites 14 placed in relatively low orbits around the earth. Each satellite 14 has a unique identification number associated with it so that satellites 14 may be distinguished from one another. Due to the configuration of constellation 12, at least one of satellites 14 is desirably within view of each point on the surface of the earth at all times. In connection with location determination within system 10, each satellite 14 functions as a locator, but no more than one locator is required to determine a location.

System 10 additionally includes one or more switching offices (SOs) 16. SOs 16 reside on the surface of the earth and are in data communication with nearby ones of satellites 14 through RF communication channels 18. Satellites 14 are also in data communication with one another through data communication channels 20. Hence, through constellation 12 of satellites 14, an SO 16 may control communications delivered to any size region of the earth. However, the region controlled by each SO 16 is preferably associated with one or more specific geo-political jurisdictions, such as one or more countries. SOs 16 couple to public switched telecommunication networks (PSTNs) 22, from which calls directed toward subscribers of system 10 may be received and to which calls placed by subscribers of system 10 may be sent.

System 10 also includes any number, potentially in the millions, of subscriber units (SUs) 24. SUs 24 may be configured as conventional portable radio communication equipment. In other words, SUs 24 may be battery powered, may consume relatively low power, and may include relatively small antennas. SUs 24 are configured to engage in communications with satellites 14 over portions of the electromagnetic spectrum that are allocated by governmental agencies associated with various geopolitical jurisdictions. SUs 24 communicate with nearby satellites 14 through communication channels 26. In connection with the location determination within system 10, SUs 24 function as locatable units.

System 10 accommodates the movement of SUs 24 anywhere on or near the surface of the earth. However, nothing requires SUs 24 to move, and system 10 operates satisfactorily if a portion of the entire population of SUs 24 remains stationary relative to the earth.

Any number of subscriber information managers (SIMs) 28 are also included within system 10. Each SIM 28 maintains a subscriber database that is relevant to only a discrete portion of the population of SUs 24. The database may include information describing features associated with SUs 24, rates to be associated with SUs 24, current locations for SUs 24, and other information which is discussed below. Each SU 24 is assigned to one of SIMS 28, and that one SIM 28 is considered the "home" SIM 28 for an SU 24. In the preferred embodiment, an SIM 28 may be associated with each SO 16. In fact, an SIM 28 and an SO 16 may utilize the same computerized hardware. In such an embodiment, an SIM 28 and an SO 16 are separated logically rather than physically. Each SO 16 may communicate with any SIM 28 through constellation 12, PSTN 22, or internal computer structures when an SO 16 communicates with its logical partner SIM 28.

In general terms, system 10 may be viewed as a network of nodes. Each SU 24, satellite 14, SO 16, and SIM 28 represents a node of system 10. All nodes of system 10 are or may be in data communication with other nodes of system 10 through communication channels 18, 20, and/or 26. In addition, all nodes of system 10 are or may be in data communication with other telephonic devices dispersed throughout the world through PSTNs 22.

Communication services, including calls, may be set up between two SUs 24 or between any SU 24 and a PSTN phone number. Except for qualifying processes which are discussed below, calls may be set up between any two locations on the earth. Generally speaking, each SU 24 engages in control communications with a nearby SO 16 through constellation 12 during call setup. These control communications take place prior to forming a communication path between an SU 24 and another unit, which may be another SU 24 or a PSTN phone number. In particular, an SU 24 communicates with the SO 16 via one or more satellites 14. This SO 16 may be considered the serving SO for that particular SU 24.

Due to their low earth orbits, satellites 14 constantly move relative to the earth. In the preferred embodiments, satellites 14 move in orbits at an altitude in the range of 500-1000 Km above the earth. If, for example, satellites 14 are placed in orbits which are around 765 km above the earth, then an overhead satellite 14 travels at a speed of around 25,000 km/hr with respect to a point on the surface of the earth. Electromagnetic signals traveling at or near the speed of light between an SU 24 positioned near the surface of the earth and a satellite communication node 14 in such an orbit will require a propagation duration of 2-3 msec or more, depending on the satellite's angle of view. Moreover, electromagnetic signals traveling between an SU 24 positioned near the surface of the earth and a satellite 14 in such an orbit may experience a considerable Doppler component of frequency shift, the precise value of which is dependent on a source frequency and the satellite's angle of view.

Figure 2:
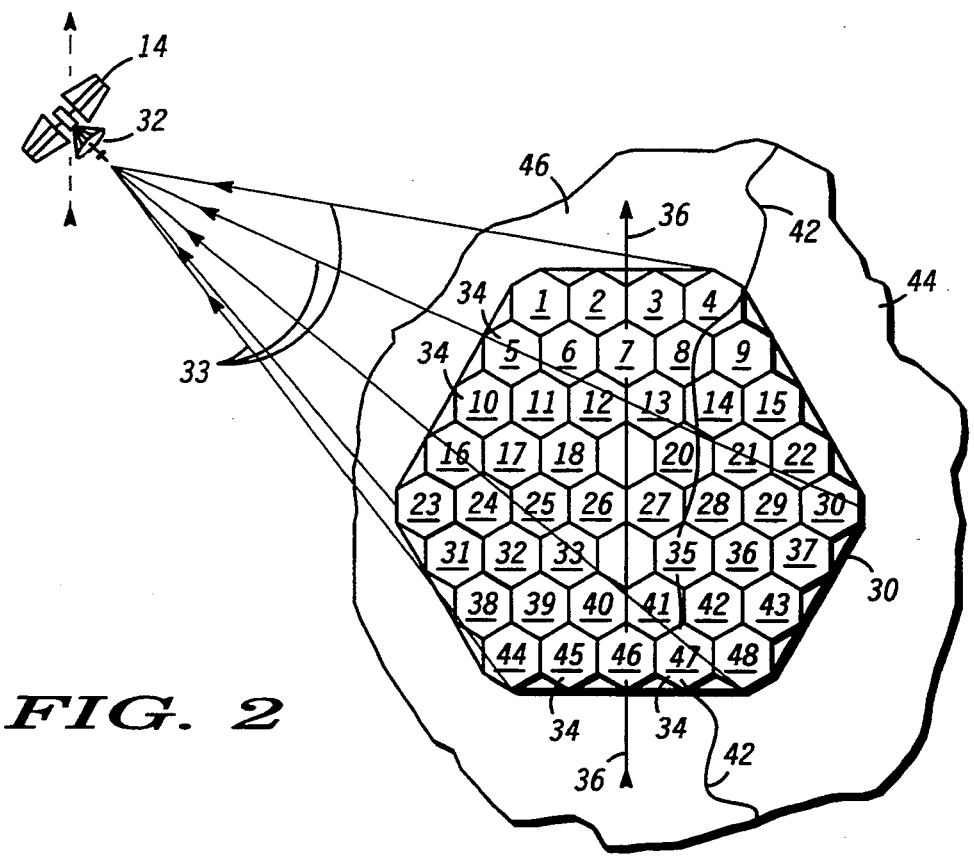
FIG. 2 shows a schematic representation of a cellular pattern formed on the surface of the earth by a satellite portion of the radio telecommunications/location system.

FIG. 2 schematically shows a cellular footprint pattern 30 formed on the surface of the earth by a single satellite 14. Each satellite 14 includes a multibeam antenna 32. Each antenna 32 projects numerous discrete antenna beams or patterns 33 toward the earth's surface at numerous diverse angles away from its satellite 14. FIG. 2 shows a diagram of a resulting pattern of cells 34 that beams 33 form on the surface of the earth. Each beam 33 is associated with a cell 34 in a one-to-one correspondence. In the preferred embodiment of the present invention, all satellites 14 are configured substantially as depicted in FIG. 2. Thus, other satellites 14 (not shown) form other similar footprints (not shown). Desirably, a continuous blanket of cells 34 substantially covers the entire surface of the earth. Cells 34 residing along the perimeter of footprint 30 may be positioned adjacent to cells 34 from other footprints 30 of other satellites 14.

Each cell 34 within footprint 30 occupies a unique position within footprint 30. These positions are distinguished from one another through the use of a cell ID, listed as 1 through 48 in FIG. 2. Some degree of location information may be obtained by identifying a cell 34 that covers a position of interest. Such location information defines a position relative to a satellite 14. Satellites 14 preferably orbit the earth in predictable orbits. In other words, a satellite's position at a particular point in time may be determined by combining the point in time with well known orbital geometry. By combining a cell's position within a footprint 30 with the satellite's position, a broadly specified location on the earth may be obtained.

For convenience, the schematic diagram of FIG. 2 illustrates cells 34 and footprint 30 as being discrete, generally hexagonal shapes without overlap or gaps. However, those skilled in the art will understand that in actual practice equal strength lines projected by beams 33 from antennas 32 of satellites 14 may actually have a shape far different than a hexagonal shape, that antenna side lobes may distort the pattern, that some cells 34 may cover larger areas than other cells 34, and that some overlap between adjacent cells may be expected.

Figure 3:
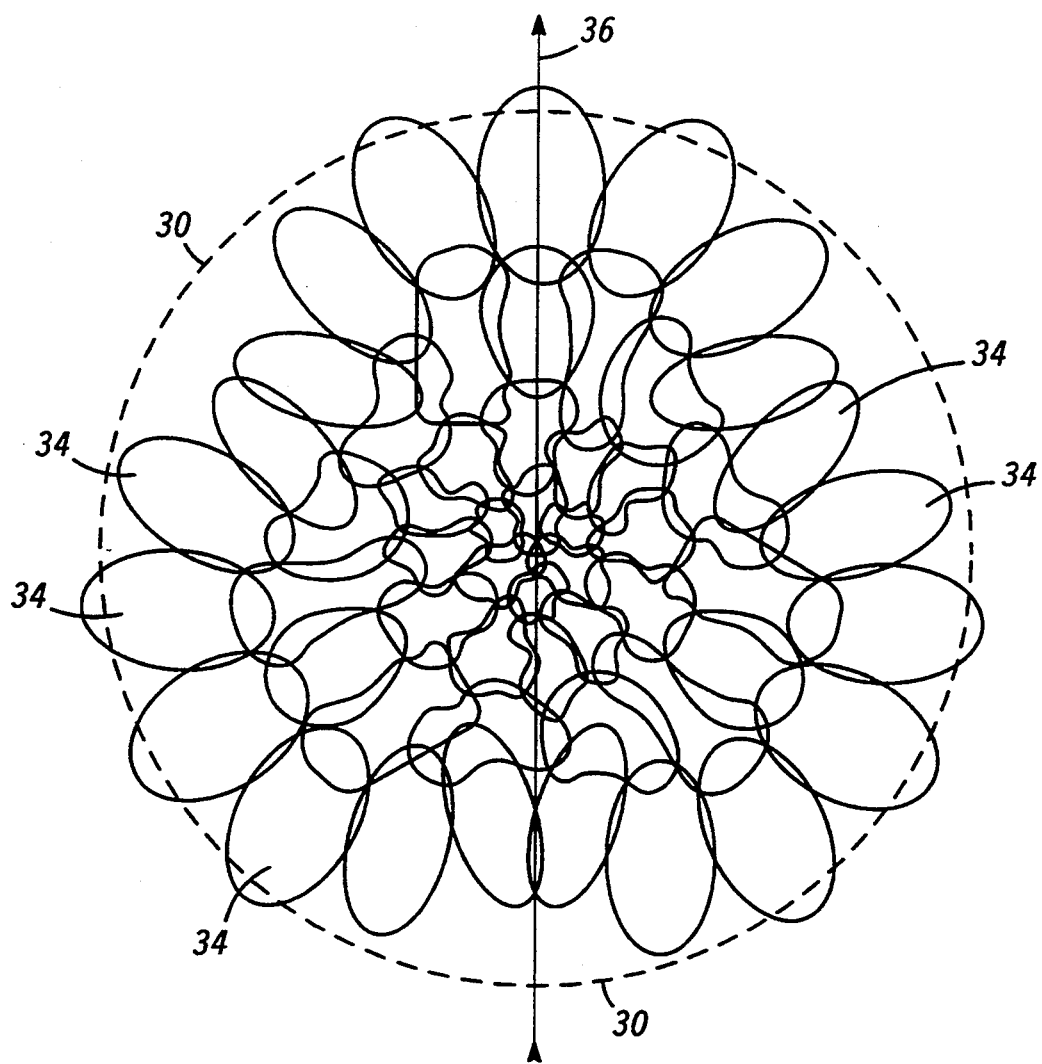
FIG. 3 shows a more realistic representation of the cellular pattern schematically indicated in FIG. 2.

FIG. 3 shows a more realistic illustration of a pattern of cells 34 within a single footprint 30 as utilized in connection with one embodiment of the present invention. In particular, the contours illustrated in FIG. 3 depict equal signal strength positions for a coverage level of 90%. Those skilled in the art will appreciate that the precise shape, size, and relative positions of cells 34 result, at least in part, from the design of antenna 32 (see FIG. 2), and that any number of different antenna designs may be employed to cause diverse multiple antenna beams 33 (see FIG. 2) to be projected away from satellite 14 at numerous diverse angles.

Due to cell overlap, side lobe peculiarities, position of a subscriber unit relative to a cell's boundary, and other factors understood to those skilled in the art, a subscriber unit 24 may be able to receive signals transmitted in more than one cell 34. Generally speaking, a subscriber unit 24 is most likely to receive signals transmitted in a cell 34 where the subscriber unit 24 is then located, and the likelihood of receiving signals from other cells diminishes as the distance to these other cells increases.

With reference back to FIG. 2, system 10 (see FIG. 1) communicates through satellites 14 with SUs 24 (see FIG. 1) using the electromagnetic spectrum. This communication takes place through antenna 32 and beams 33. Those skilled in the art will appreciate the multiple beams 33 formed by antenna 32 define a geometry and do not imply a particular direction of communication. In other words, communications may be transmitted and/or received through the beams 33 projected by antenna 32 toward the earth's surface.

This communication uses only a limited amount of the electromagnetic spectrum. The precise parameters of this spectrum are unimportant to the present invention and may vary from system to system. The present invention divides this spectrum into discrete portions or channel sets. For example, the spectrum may be divided into discrete frequency bands, discrete time slots, discrete coding techniques, or a combination of these. The precise manner of dividing this spectrum is also unimportant to the present invention. Desirably, each of these discrete channel sets is orthogonal to all other channel sets. In other words, simultaneous communications may take place at a common location over every channel set without significant interference. As is conventional in cellular communication systems, the channel sets are assigned to cells 34 through a reuse scheme which prevents adjacent cells 34 from using the same channel sets. However, common channel sets are reused in spaced apart cells 34 to efficiently utilize the allocated spectrum.

In the preferred embodiment of the present invention, a beam broadcast signal is continually transmitted from satellite 14 through each beam 33. Each beam's broadcast signal has different parameters than other beams' broadcast signals, and each beam's broadcast signal carries information identifying the satellite 14 broadcasting the signal, and the cell 34 with which the beam's broadcast signal is associated. The identities and frequency, timing, and/or coding parameters of these broadcast signals are known to subscriber units 24.

Each satellite 14 is associated with a nadir direction. The nadir direction is defined by an imaginary line (not shown) extending from the satellite 14 toward the center of the earth. For a given satellite 14, a ground point resides where the nadir direction intersects the surface of the earth. As the satellite 14 moves around the earth in its orbit, this ground point forms a satellite ground track 36.

As shown in FIGS. 2 and 3, a first portion of cells 34 in footprint 30 resides far to the left of ground track 36, a second portion of cells 34 in footprint 30 resides far to the right of ground track 36. Likewise, a third portion of cells 34 resides on the left side of, but close to ground track 36, and a fourth portion of cells 34 resides on the right side of, but close to ground track 36. A fifth portion of cells 34 generally overlies ground track 36. The precise definitions for distinguishing between the first and third portions of cells 34, the second and fourth portions of cells 34, the third and fifth portions of cells 34 or the fourth and fifth portions of cells 34 are not important parameters in the present invention and may be selected somewhat arbitrarily.

With reference to FIG. 2, on the surface of the earth, a boundary 42 separates a first jurisdiction 44 from a second jurisdiction 46. Any number of boundaries 42 may divide the entire earth's surface into any number of different jurisdictions. Boundaries 42 need not represent physical phenomena of the earth. Rather, boundaries 42 represent lines imposed over the geography of the earth to achieve some of the goals of system 10 (see FIG. 1). Nothing prevents the existence of more than one set of boundaries 42 corresponding to the same sections of the earth. Boundaries 42 may divide the earth into geopolitical jurisdictions, communication service rate jurisdictions, and the like. System 10 qualifies communication services provided to an SU 24 in accordance with the one or more jurisdictions within which the SU 24 resides.

Figure 4:
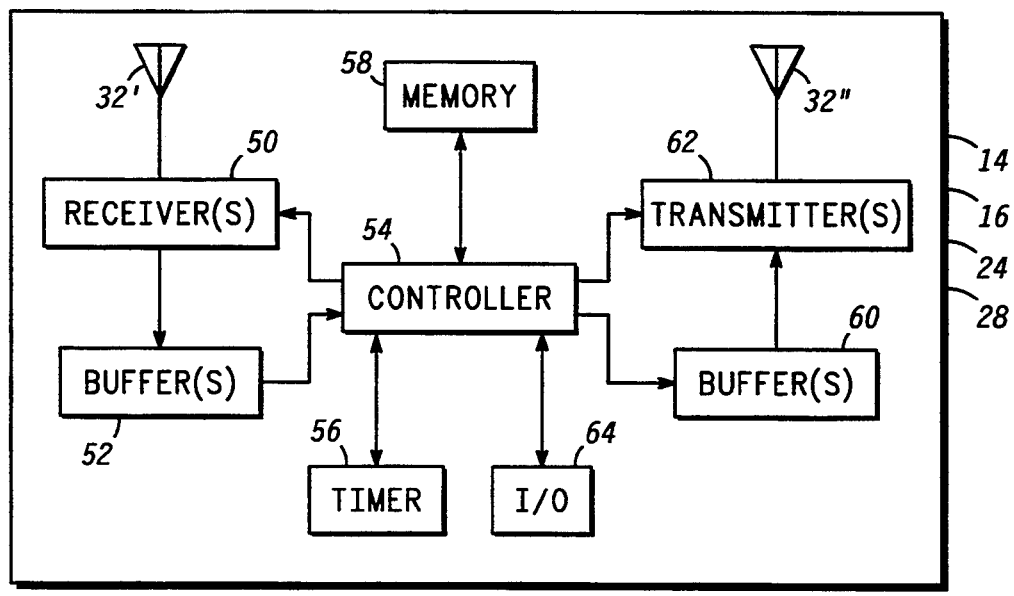
FIG. 4 shows a block diagram of a node of the radio telecommunications/location system.

FIG. 4 shows a block diagram of any node 48 of radio telecommunications/location system 10 (see FIG. 1). As discussed above, any SU 24, satellite 14, SO 16, or SIM 28 represents a node of system 10. Node 48 includes one or more receivers 50. Receivers 50 couple to an antenna 32' to receive signals from communication channels 18, 20, and/or 26 (see FIG. 1). While an SU 24, SO 16, or SIM 28 may include only a single receiver 50, a satellite 14 includes many receivers for simultaneously communicating over numerous different ones of channels 18, 20, and 26 (see FIG. 1). Antenna 32' desirably is or includes a multibeam antenna in satellite 14. Receivers 50 couple to receive buffers 52, which temporarily store data received at receivers 50 until these data can be processed.

A controller 54 couples to receive buffers 52 and to receivers 50. Controller 54 couples to receivers 50 to control receive parameters, such as frequency, timing, and the like. Controller 54 additionally couples to a timer 56, a memory 58, transmit buffers 60, and transmitters 62. Controller 54 uses timer 56 to help monitor real time through maintaining the current date and time. Memory 58 includes data which serve as instructions to controller 54 and which, when executed by controller 54, cause node 48 to carry out processes which are discussed below. In addition, memory 58 includes variables, tables, and databases that are manipulated due to the operation of node 48. Transmit buffers 60 are used to temporarily store data placed therein by controller 54. Controller 54 couples to transmitters 62 to control transmit parameters, such as frequency, timing, and the like. While SUs 24, SOs 16, and SIMs 28 may include only one transmitter 62, satellites 14 desirably include numerous transmitters 62 for simultaneously communicating over numerous different ones of channels 18, 20, and 26 (see FIG. 1). Transmit buffers 60 also couple to transmitters 62. Transmitters 62 transmit signals modulated to carry the data stored in transmit buffers 60. These signals are transmitted through an antenna 32" over channels 18, 20, and 26. For satellite 14, antenna 32" is or includes a multibeam antenna. Those skilled in the art will appreciate that antennas 32' and 32" may actually be implemented together using a single antenna.

In earth-based nodes 48, controller 54 also couples to an I/O section 64. In an SU 24, I/O section 64 may include microphones, speakers, digitizers, vocoders, decoders, and the like, to convert between audio and digitized packets that are compatible with system 10 (see FIG. 1). Likewise, I/O section 64 may include a keypad for controlling the operation of SU 24 by a user. In an SO 16 or SIM 28, I/O section 64 may include keyboards, displays, magnetic memory devices, printers, and other devices conventionally coupled to computerized equipment. In an SO 16, I/O section 64 may additionally include components for coupling to a PSTN 22 (see FIG. 1).

In short, each node 48 represents a programmable machine which takes on the character assigned to it by software programming located in memory 58 and executed by controller 54. As is discussed below, the present invention configures nodes 48 as measurement processors, location processors, service processors, and the like. Since each node 48 is or may be in data communication with other nodes 48, the precise location and distribution of many of these processors and the tasks they perform are less important considerations. By way of example, the functions of SIMs 28 may be performed on the same hardware which performs the functions of SOs 16, or the functions may be performed on different hardware. In the preferred embodiment, satellites 14 represent locator units, and SUs 24 represent locatable units. Thus, satellites 14 perform the functions of locator unit measurement processors and subscriber units perform the functions of locatable unit measurement processors in the preferred embodiment. However, those skilled in the art can adapt the teaching of the present invention to situations where locatable units are represented by satellites or other moving objects while locator units are represented by more stable subscriber or other units. While the differences between various processors discussed below may be physical due to their location in different ones of SUs 24, satellites 14, SOs 16, and SIMs 28. Absent the controlling software, any physical differences may be of only minor importance. Rather, these processors are logically distinct from one another. These logical differerneces results in different physical operation of processors 66, 68, 70, and 72.

FIGS. 5–7 and 10 depict a locatable unit measurement processor 66, a locator unit measurement processor 68, a location processor 70, and a service processor 72, respectively. Processors 66, 68, 70, and 72 are implemented by nodes 48 within radio telecommunication system 10. Those skilled in the art will appreciate that the processors discussed below in connection with FIGS. 5–7 and 10 are controlled by programming instructions placed in a memory 58 (see FIG. 4) of the node 48 where that processor may be located. Moreover, in the preferred embodiment of the present invention, all SUs 24, satellites 14, SOs 16, and SIMs 28 perform substantially the same processes as other SUs 24, satellites 14, SOs 16, and SIMs 28, respectively. Thus, while the description presented below is directed toward a single SU 24, a single satellite 14, a single SO 16, a single SIM 28, and a single call, the following description may be viewed as applying to all SUs 24, satellites 14, SOs 16, SIMs 28, and calls.

Figure 5:
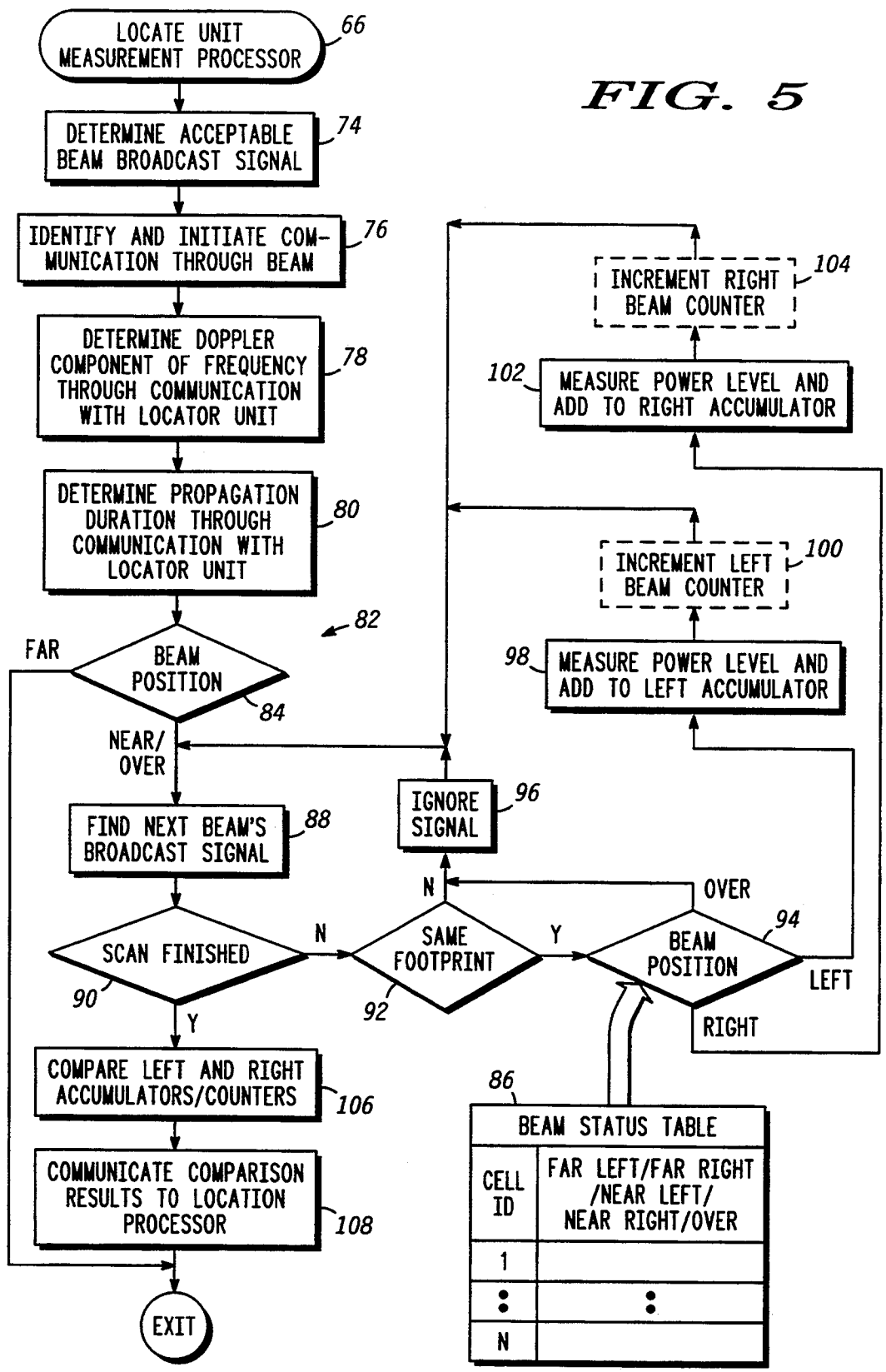
FIG. 5 shows a flow chart of tasks performed by a locatable unit measurement processor portion of the radio telecommunications/location system.

FIG. 5 shows a flow chart of tasks performed by locatable unit measurement processor 66. The preferred embodiment of the present invention distributes the functions of a measurement processor between the communication node 48 (see FIG. 4) provided by satellite 14, hereinafter referred to as a locator unit 14, and SU 24, hereinafter referred to as a locatable unit 24. However, those skilled in the art could alternatively adapt the measurement processor to operate only at locator unit 14 or only at locatable unit 24 for other systems.

Generally speaking, locatable unit measurement processor 66 causes locatable unit 24 to engage in activities that will allow system 10 to determine the location of locatable unit 24. As will be discussed in more detail below, these activities are concerned with determining three pieces of information. Two of these pieces of information are Doppler component and propagation duration for electromagnetic signals communicated between locatable unit 24 and a locator unit 14. The third piece of information indicates whether locatable unit 24 resides to the left or right of ground track 36 (see FIGS. 2 and 3). With these three pieces of information, location processor 70 (see FIG. 7) can determine an actual position for locatable unit 24.

Measurement processor 66 may be activated whenever locatable unit 24 is initially powered up, whenever it has temporarily lost contact with system 10, whenever it has received instructions via I/O section 64 (see FIG. 4) to initiate a call, whenever a locator unit 14 requests its activation, or in any other circumstance where it is advantageous for system 10 to do so. Processor 66 performs a task 74 to determine an acceptable beam broadcast signal. During task 74, locatable unit 24 attempts to receive various beam broadcast signals, discussed above. When an acceptable beam broadcast signal has been received, program control proceeds past task 74. The present invention contemplates the use of any one of many different criteria in determining whether a beam broadcast signal is acceptable. For example, task 74 may identify the signal exhibiting the greatest strength. Alternatively, task 74 may identify the first signal it finds to have a strength greater than a predetermined level, or task 74 may additionally identify a signal exhibiting suitable strength and a predetermined Doppler characteristic. Desirably, the criteria used in task 74 allows locatable unit 24 to quickly identify an acceptable beam broadcast signal.

After task 74, a task 76 identifies the beam 33 (see FIG. 2) through which the beam's broadcast signal is conveyed and initiates communication with locator unit 14 through this beam 33. The beam 33 may be identified by detecting a cell ID conveyed by the beam's broadcast signal. Locatable unit 24 initiates communication by transmitting a message to locator unit 14.

Next, a task 78 causes locatable unit 24 to communicate with locator unit 14 (or vice versa) to determine a Doppler component of the frequency used for the communications. This communication may involve transmitting and receiving messages between locatable unit 24 and locator unit 14. This determination may, for example, be made by first synchronizing a frequency base used in locatable unit 24 to the frequency base of locator unit 14, then transmitting a signal from one of locator unit 14 and locatable unit 24 and receiving the signal at the other of locator unit 14 and locatable unit 24. The frequency of the received signal can then be measured to determine the frequency offset from a predetermined frequency. However, any alternate Doppler measurement technique known to those skilled in the art may be used as well. Locator unit measurement processor 68, discussed below in connection with FIG. 6, performs a complementary task and causes the Doppler component parameter to be written to a measurement record which is then sent to location processor 70 (see FIG. 7).

Before or during task 78, or after task 78 as shown in FIG. 5, a task 80 determines signal propagation duration (i.e. path delay) for the same or another electromagnetic signal communicated between locatable unit 24 and locator unit 14. As discussed above, this duration may be in the range of 2-9 msec or more. This determination may be made by first synchronizing a time base used in locatable unit 24 to the time base of locator unit 14, then transmitting a signal from one of locator unit 14 and locatable unit 24 and receiving the signal at the other of locator unit 14 and locatable unit 24. The received signal may then be measured to determine any temporal offset from a predetermined point in time. However, any alternate propagation delay measurement technique known to those skilled in the art may be used as well.

Locator unit measurement processor 68, discussed below in connection with FIG. 6, performs a complementary task and causes the propagation duration parameter to be written to the measurement record and sent to location processor 70 (see FIG. 7).

After tasks 78 and 80, locatable unit measurement processor 66 performs a broadcast channel scan process 82. Generally speaking, process 82 monitors all beam broadcast signals that can be received by locatable unit 24. Broadcast signals associated with left-of-ground-track beams 33 are then compared with broadcast signals associated with right-of-ground-track beams 33 to determine whether locatable unit 24 is located to the left or right of ground track 36 (see FIGS. 2-3).

Scan process 82 includes a query task 84 which determines where the beam 33 for the broadcast signal to which locatable unit 24 is currently tuned resides relative to ground track 36. The beam 33 may be identified through the cell ID communicated by the beam's broadcast signal. Once beam 33 has been identified, task 84 may consult a beam status table 86, a block diagram of which is shown in FIG. 5, to make this determination. Table 86 is constructed to associate far-left-of-ground-track, far-right-of-ground-track, near-left-of-ground-track, near-right-of-ground-track, and over-ground-track status indications with each cell 34 included in a footprint 30 (see FIGS. 2 and 3). The entries in Table 86 are constant unless the cell arrangement is changed or moved relative to the nadir line. Table 86 may be stored in memory 58 (see FIG. 4) of the node 48 (see FIG. 4) which serves as locatable unit 24. Using the cell ID, task 84 can look up (connecting arrow not shown in FIG. 5) a far status indication or a near/over status indication for the beam 33 from table 86.

If beam 33 is associated with a cell 34 located far from ground track 36 (see FIGS. 2-3), scan process 82 is not needed. In this situation program control exits scan process 82 and measurement processor 66. Scan process 82 may be skipped because a reliable left-of-ground-track or right-of-ground-track determination may be made in response to the identity of the cell 34 associated with the currently monitored beam 33.

On the other hand, when the beam 33 is projected near or over ground track 36 (see FIGS. 2-3), a reliable determination of left-of-ground-track or right-of-ground track status is difficult to obtain simply in response to cell identity. In this situation, a task 88 of scan process 82 finds the next beam's broadcast signal. Task 88 may tune receiver 50 (see FIG. 4) of locatable unit 24 to a channel for another one of a finite number of predetermined broadcast channels used by system 10 to convey beam broadcast signals. Nothing requires locatable unit 24 to be able to receive all possible broadcast channels, and locatable unit 24 completes task 88 when another beam's broadcast signal is detected.

After task 88, a query task 90 determines whether scanning is finished. Scanning may be finished when, for example, task 88 identifies a beam broadcast signal which has previously been tested by scan process 82. When task 90 determines that scanning is not yet finished, a query task 92 determines whether the current beam broadcast signal is associated with the same footprint 30 (see FIGS. 2-3) as the broadcast signal identified above in task 74. If the broadcast signal is associated with the same footprint 30, then it is being transmitted from substantially the same point in space as previously tested beam broadcast signals. The identity of footprint 30 may be determined by monitoring the satellite ID communicated over the broadcast signal.

When task 92 detects the same footprint 30, a query task 94 determines the current beam's position. Task 94 may use the cell ID obtained from the newly received beam broadcast signal to determine the beam's position. As discussed above in connection with task 84, task 94 may consult beam status table 86 in making this determination. If task 94 determines that the beam 33 through which the current broadcast signal has been transmitted is projected over ground track 36 (see FIGS. 2-3), then program control proceeds to a task 96, which will ignore the broadcast signal and refrain from processing the signal's characteristics. Likewise, if task 92 determines that a current broadcast signal is associated with another footprint 30 (see FIGS. 2-3), then program control passes through task 96 to ignore the broadcast signal.

The ignored signals will have no influence over the left-of-ground-track or right-of-ground-track determination made by scan process 82. Broadcast signals transmitted from other locator units 14 are transmitted from a different point in space. Thus, their characteristics, such as power level or amplitude, may be different from signals transmitted from the same point in space due to interfering structures, weather conditions (such as clouds or rain), reflections, and the like. Such differential characteristics are ignored so that they will not have a corrupting influence on the left-of-ground-track or right-of-ground-track determination. Characteristics, such as power level, of signals projected substantially over ground track 36 (see FIGS. 2-3) do not lend credence to either a left-of-ground-track or right-of-ground-track decision. Thus, these signals are also ignored. After task 96, program control loops back to task 88 to find another beam's broadcast signal.

When task 94 determines that the position of the beam 33 through which the current broadcast signal is transmitted is left of ground track 36, without regard to whether it is far from or near to ground track 36, processor 66 performs a task 98. Task 98 measures the strength or power level of the received signal and adds this value to an accumulator associated with the left side of ground track 36. Of course, this accumulator is set to an initial value (not shown), such as zero, prior to adding the first value. Those skilled in the art will appreciate that task 98 may alternatively measure any of a variety of signal parameters, such as amplitude, which indirectly relate to power level. FIG. 5 illustrates a task 100 in phantom because it represents an alternate embodiment to task 98 which may be performed either in lieu of task 98 or in connection with task 98. Task 100 increments a counter which keeps track of the number of beams 33 projected on the left side of ground track 36 and encountered by scan process 82. Of course, this counter is preferably set to an initial value, such as zero, prior to performing scan process 82. After tasks 98 and/or 100, program control loops back to task 88 to find another beam's broadcast signal.

When task 94 determines that the beam 33 through which the current broadcast signal is transmitted is projected to the right of ground track 36, without regard to whether it is far from or near to ground track 36, processor 66 performs tasks 102 and/or 104. Tasks 102 and 104 are the same as tasks 98 and 100, respectively, except that they operate an accumulator and counter associated with beams 33 projected to the right of ground track 36. After tasks 102 and/or 104, program control loops back to task 88 to find another beam's broadcast signal.

Eventually, task 90 determines that the scanning portion of scan process 82 has finished. At this point, all broadcast signals which can be received at locatable unit 24 have been processed, except for the signals ignored in accordance with task 96. The left accumulator operated by task 98 contains a value representing the sum of the signal strengths for all broadcast signals received at locatable unit 24 in spite of being projected to the left of ground track 36, and the right accumulator operated by task 102 contains a value representing the sum of the signal strengths for all broadcast signals received at locatable unit 24 in spite of being projected to the right of ground track 36. Likewise, the left counter operated by task 100 indicates the number of broadcast signals received at locatable unit 24 in spite of being projected to the left of ground track 36, and the right counter operated by task 104 indicates the number of broadcast signals received at locatable unit 24 in spite of being projected to the right of ground track 36.

When task 90 determines that the scanning portion of scan process 82 has finished, a task 106 compares the left and right accumulators and/or counters to determine whether a greater total power level or a greater total number of broadcast signals are received from left-of-ground-track beams 33 or from right-of-ground-track beams 33. Task 106 may desirably normalize values included in the left and right accumulators before performing comparisons. After task 106, a task 108 communicates the comparison results from task 106 to location processor 70 (see FIG. 7). As discussed below, the comparison results may desirably be communicated through locator unit measurement processor 68 (see FIG. 6). After task 108, program control exits locatable unit measurement processor 66.

While FIG. 5 depicts scan process 82 as taking place after the performance of task 80, other embodiments are clearly possible and intended to be included within the scope of the present invention. For example, a portion or all of scan process 82 may be incorporated into task 74. In such an embodiment, task 74 may begin or even complete scan process 82 while determining an acceptable beam broadcast signal.

Figure 6:
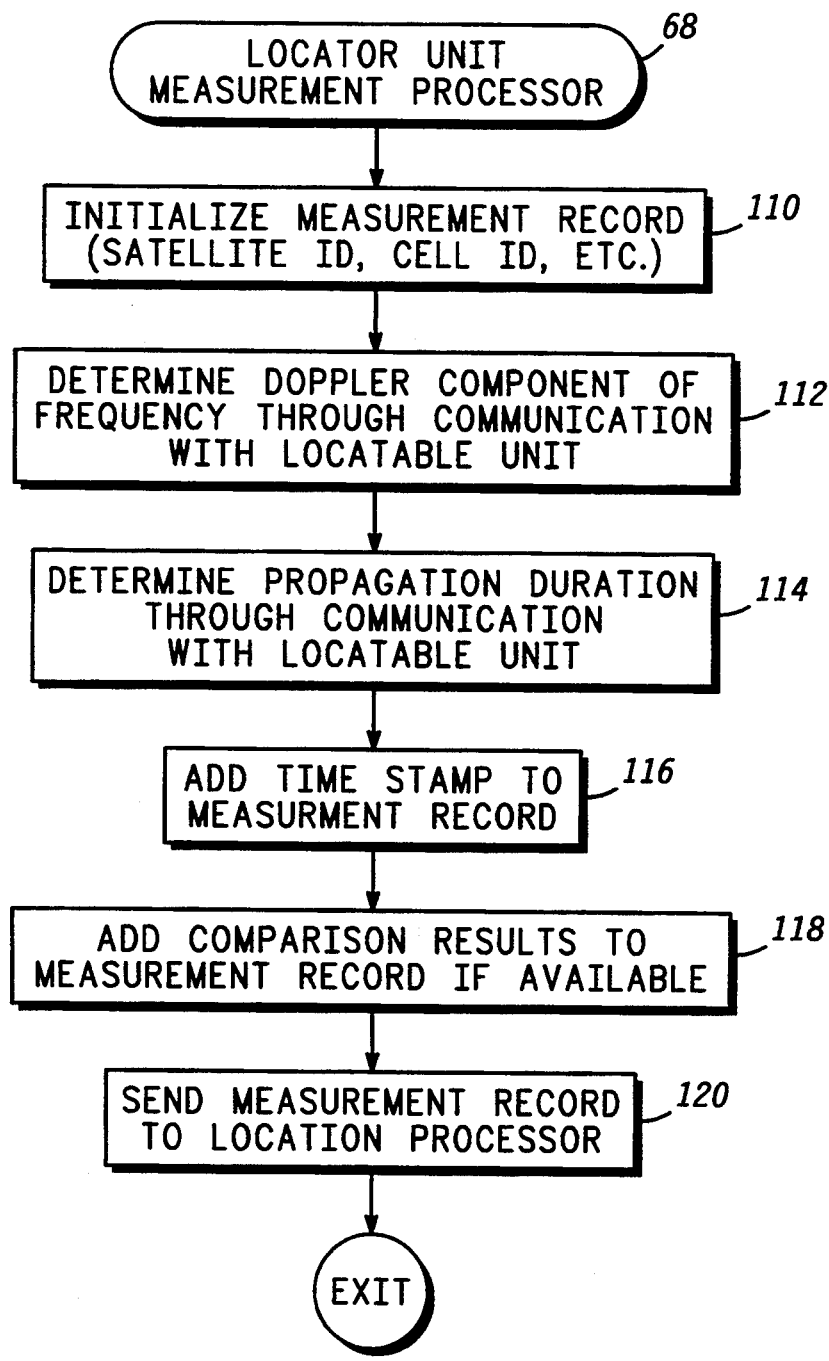
FIG. 6 shows a flow chart of tasks performed by a locator unit measurement processor portion of the radio telecommunications/location system.

FIG. 6 shows a flow chart of tasks performed by locator unit measurement processor 68 of radio telecommunications/location system 10. Preferably, processor 68 resides within locator unit 14, and processor 68 operates cooperatively with locatable unit measurement processor 66 (see FIG. 5). Processor 68 may be activated in many different situations, including the receipt of an initial communication from a locatable unit 24 and the receipt of a command from location processor 70 (see FIG. 7).

Measurement processor 68 operates while communications take place between locatable unit 24 and locator unit 14. As is conventional in cellular communications, these communications take place through a particular one of cells 34 (see FIG. 2). Once activated by locatable unit 24 accessing system 10, by locatable unit 24 attempting to setup a call to a called party, by an instruction from location processor 70 (see FIG. 7), or otherwise, processor 68 performs a task 110 to initialize a measurement record. This initialization may, for example, include the writing of a locator unit's ID and the ID of the cell 34 (see FIG. 2) within which communications are taking place to the measurement record. As discussed above, the cell ID identifies the beam 33 through which signals are communicated with the locatable unit 24. In addition, initialization may include the writing of the locatable unit's ID and other parameters, such as frequency or channel ID, that may describe the communications taking place between locator unit 14 and locatable unit 24.

After task 110, processor 68 performs a task 112 to determine the Doppler component of the frequencies used in communicating an electromagnetic signal between locatable unit 24 and locator unit 14 through the identified beam 33. Task 112 operates in cooperation with task 78, discussed above in connection with FIG. 5. Task 112 additionally adds data describing the determined Doppler component to the measurement record. In conjunction with task 112, or after task 112 as shown in FIG. 6, a task 114 determines signal propagation duration for the same or another electromagnetic signal communicated through the beam 33 between locatable unit 24 and locator unit 14. Task 114 operates in cooperation with task 80, discussed above in connection with FIG. 5. Task 114 then adds data describing the propagation duration to the measurement record. After task 114, a task 116 adds a time stamp to the measurement record. The time stamp defines the point in real time at which the measured communications characterized above in tasks 112 and 114 were taking place between locatable unit 24 and locator unit 14.

After task 116, a task 118 obtains and adds the comparison results discussed above in connection with tasks 106 and 108 (see FIG. 5) to the measurement record if they are available. In the embodiment of locatable unit measurement processor 66 depicted in FIG. 5, where scan process 82 occurs after Doppler and propagation duration determinations, the comparison results may not be available for a few seconds. Rather than wait for the comparison results to become available, processor 68 desirably continues past task 118. On the other hand, if all or part of scan process 82 takes place prior to determining Doppler and propagation duration, then comparison results may be available at task 118, and the comparison results are included in the measurement record.

As discussed below, location processor 70 (see FIG. 7) may request locator unit measurement processor 68 to obtain a subsequent set of location parameters. If comparison results are not available for inclusion in the measurement record with original location parameters, then they will probably be available for a subsequent set of location parameters obtained by a subsequent invocation of locator unit measurement processor 68 with respect to this locatable unit 24.

Figure 7:
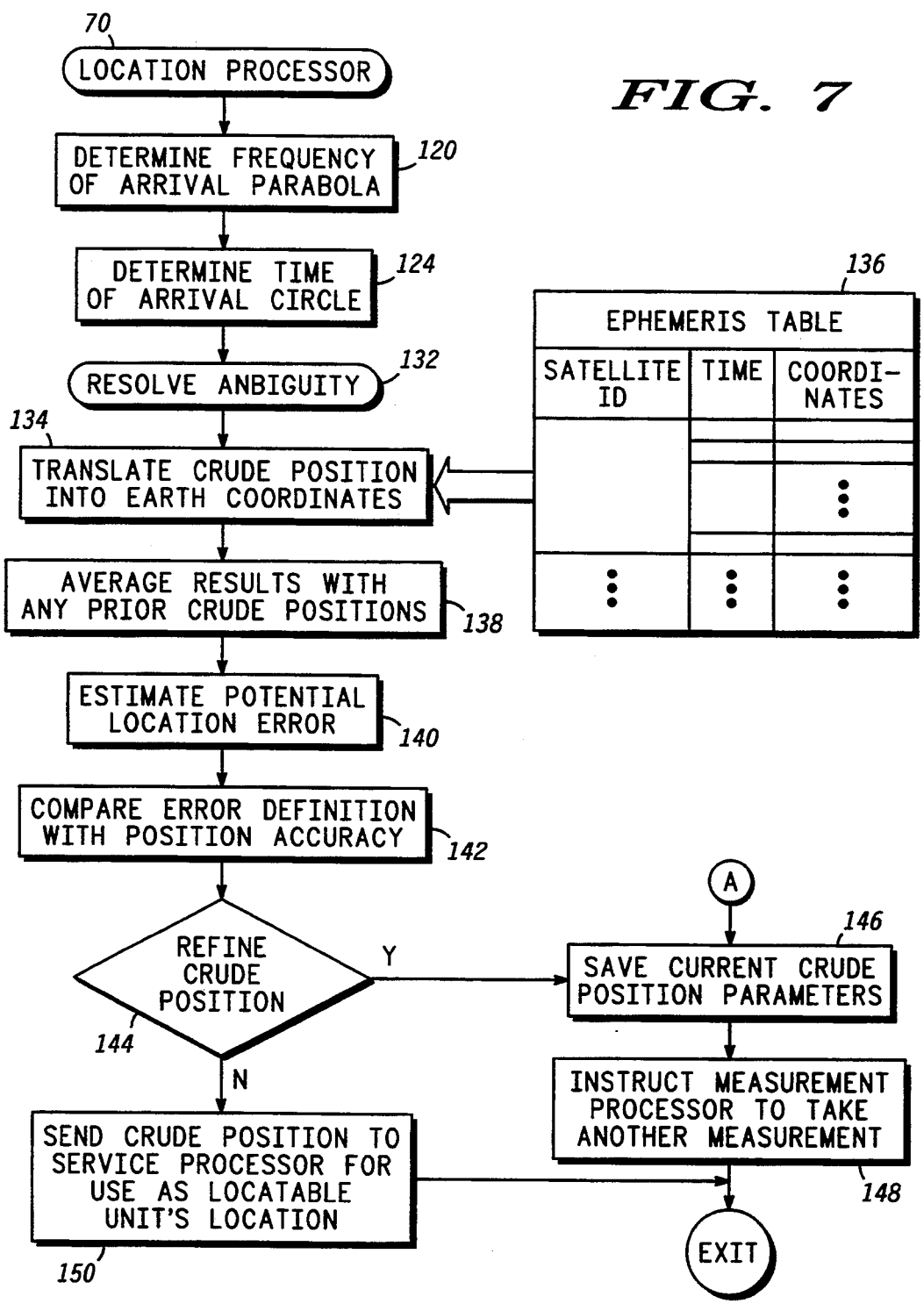
FIG. 7 shows a flow chart of tasks performed by a location processor portion of the radio telecommunications/location system.

After task 118, a task 120 sends the measurement record to location processor 70 (see FIG. 7). The measurement record contains location parameters that location processor 70 uses to determine the location of locatable unit 24. In the preferred embodiment, a location processor 70 resides in each SIM 28 (see FIG. 1). The particular SIM 28 which receives the measurement record is the home SIM 28 for the locatable unit 24 whose location is being determined. This particular home SIM 28 may be distinguished from other SIMs 28 through the locatable unit's ID. After task 120, program control exits locator unit measurement processor 68, and processor 68 becomes inactive. However, processor 68 may be reactivated at any time with respect to this or another locatable unit 24. Moreover, nothing prevents processor 68 from being configured in a reentrant fashion in locator unit 14 to simultaneously take measurements for more than one locatable unit 24 at a time.

FIG. 7 shows a flow chart of tasks performed by location processor 70. While location processors 70 are preferably implemented in SIMs 28, those skilled in the art could adapt location processors 70 for implementation in any other node 48 (see FIG. 4) of system 10, or an independent node (not shown) can be established to implement a single location processor 70 for the entire system 10 and all locatable units 24. Radio telecommunications/location system 10 activates location processor 70 with respect to a specific locatable unit 24 when a measurement record relating to that locatable unit 24 is received at the node 48 within which location processor 70 resides. Location processor 70 either forms a crude position estimate using the location parameters obtained in the measurement record, requests an additional measurement record, or refines a previous crude position into a usable location for the locatable unit 24.

In particular, location processor 70 performs a task 120 to determine one or more frequency of arrival hyperbolas to fit the Doppler component data contained in the measurement record. Since locator units 14 are orbiting the earth and locatable units 24 are located on or near the earth's surface, the direction with which a locator unit 14 moves with respect to a locatable unit 24 continually changes. Since this direction continually changes but locator unit orbital speed remains relatively constant, %he component of locator unit velocity in a radial direction toward locatable unit 24 continually changes. As a result of the continual velocity change, the Doppler component continually changes relative to a stationary locatable unit 24 near the earth's surface.

On the other hand, a given Doppler component could be reported from any point located on a parabolic shape geographically centered generally about ground track 36 (see FIGS. 2 and 3) and extending away from the locator unit 14. More precisely, the hyperbolic shape is generally symmetrical about a distinguishing line defined by ground track 36. Those skilled in the art will recognize that ground track 36 represents the axis of Doppler symmetry which is offset from the true satellite ground track by earths rotation.

Figure 8:
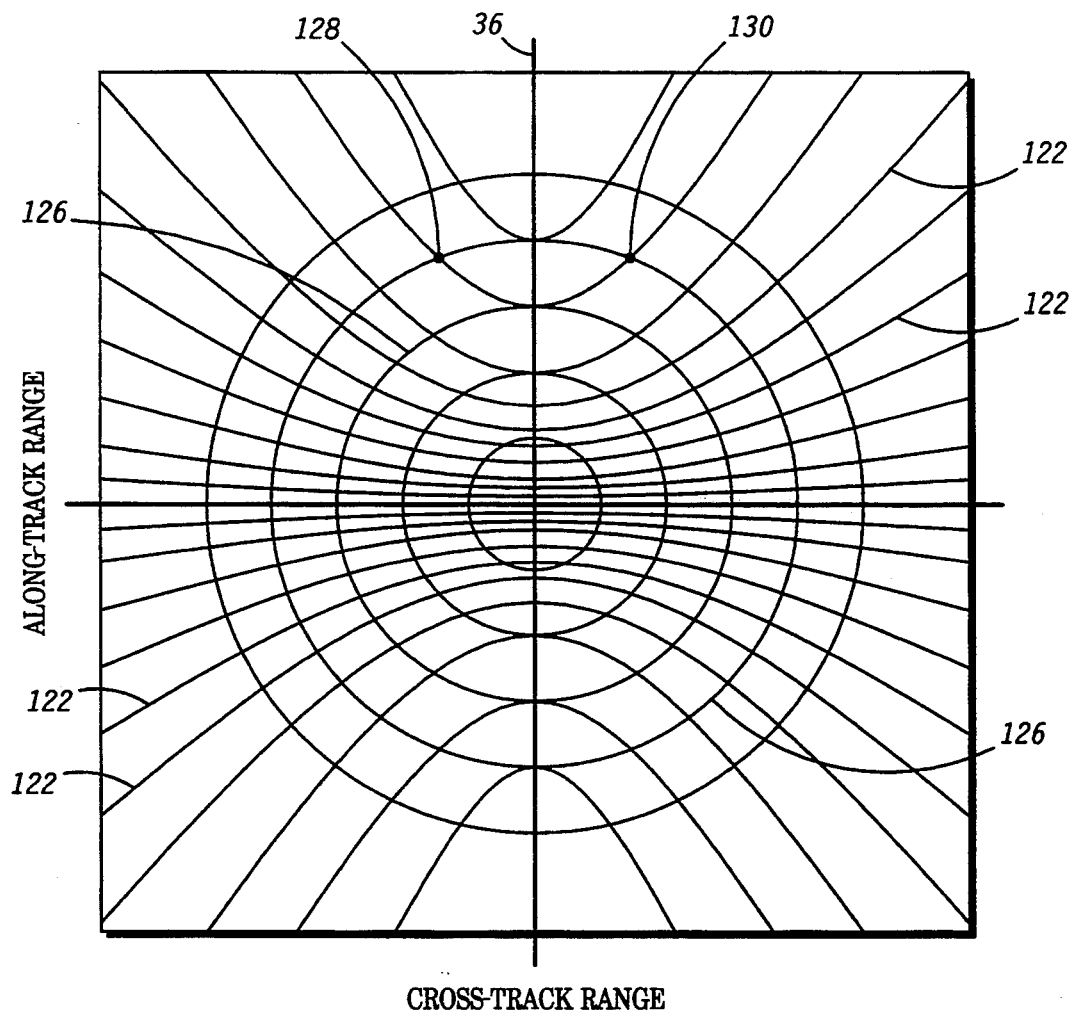
FIG. 8 graphically depicts constant Doppler and constant propagation duration curves which illustrate location determination in the radio telecommunications system.

FIG. 8 graphically depicts constant Doppler curves 122. As shown in FIG. 6, a given Doppler component may be graphically plotted on the surface of the earth as a hyperbola approximately centered along ground track 36. The given Doppler component extends away from a locator unit 14. Higher Doppler rates result in thinner hyperbolas 122. At zero Doppler, which occurs when a locator unit 14 is directly overhead a locatable unit 24, the Doppler curve has an infinite width and resembles a straight line perpendicular to ground track 36. The frequency of arrival (FOA) hyperbola or curve determined in task 120 (see FIG. 7) represents the curve 122 that describes the Doppler component indicated in the measurement record.

Those skilled in the art will appreciate that the actual measured Doppler will characterize movement of locatable unit 24 as well as movement of locator unit 14. Radio telecommunications/location system 10 permits locatable units 24 to move. However, due to the low earth orbits of locator units 14, locator units 14 move at a much greater speed than is possible for locatable units 24. Consequently, the speed or movement of locatable units 24 may be ignored for the purposes of this discussion.

Moreover, those skilled in the art will appreciate that a constant Doppler curve in three-dimensional space is actually a hollow, three-dimensional hyperbola, or hyperboloid. With reference back to FIG. 7, the results of task 120 need not describe the perimeter of this hyperboloid but rather the two-dimensional intersection of this hyperboloid on the surface of the earth. For convenience, the constant Doppler curves 122 shown in FIG. 8 ignore the minor distortion in shape caused by the curvature of the earth.

While the preferred embodiment of the present invention directly uses Doppler components, those skilled in the art will appreciate that Doppler may be used indirectly to identify other location curves. For example, those skilled in the art will appreciate that the above-described orbital geometry produces a Doppler component which changes in time. Nothing prevents detecting Doppler change and fitting curves to Doppler change rather than direct Doppler. Those skilled in the art will understand that the term Doppler as used herein is intended to encompass all such indirect usages of Doppler as well as direct usage of Doppler.

After task 120 determines the frequency of arrival hyperbola on the surface of the earth, a task 124 determines a time of arrival circle which fits the propagation duration data contained in the measurement record. Since electromagnetic signals propagate through the atmosphere at a constant velocity of approximately the speed of light, a given propagation duration dictates that the source of a signal responsible for the propagation duration must reside on the surface of a sphere having a radius approximately equal to the propagation duration times the speed of light and centered at the point where the signal is received. In the present invention, the source of an electromagnetic signal may be a locatable unit 24 residing on or near the surface of the earth and the signal may be received at a locator unit 14 orbiting the earth. Thus, a time of arrival circle represents the intersection of a sphere, centered at locator unit 14 and having a radius equivalent to the speed of light times the propagation duration, with the earth's surface.

FIG. 8 graphically depicts constant time of arrival (TOA) circles 126. As shown in FIG. 8, a given propagation duration may be graphically plotted on the surface of the earth as a circle centered at the point on ground track 36 where the locator unit's nadir direction intersects the surface of the earth. Longer propagation durations result in circles having larger radii. The TOA curve determined in task 124 (see FIG. 7) represents the circle 126 that describes the propagation duration indicated in the measurement record.

The intersection of FOA curve 122 determined in task 120 with the TOA curve 126 determined in task 124 provides a two-position solution to the location determination problem, as graphically illustrated in FIG. 8 at example positions 128 and 130. One position from the two-position solution resides to the left of ground track 36 and the other resides to the right of ground track 36. Of course, the two-position solution is ambiguous because only one of these two solutions is correct. In other words, one of the two positions is the actual position for locatable unit 24 and the other position is an image of the actual position.

Referring back to FIG. 7, after tasks 120 and 124 have determined frequency and time of arrival curves 122 and 126, a procedure 132 resolves the ambiguity presented by the two-position solution. Resolve ambiguity procedure 132 is discussed in detail below in connection with FIG. 9. In general, procedure 132 selects one of the two positions as a crude position that describes the location of locatable unit 24. Moreover, the crude position is specified in terms relative to locator unit 14.

After completion of procedure 132, a task 134 translates the crude position from coordinates based on locator unit 14 into earth coordinates, such as latitude and longitude. Since locator unit 14 travels in a predictable orbit, this translation may take place by consulting an ephemeris table 136, a block diagram of which is illustrated in FIG. 7. Ephemeris table 136 may be retained in memory 58 (see FIG. 4) of the node 48 (see FIG. 4) which implements location processor 70. Table 136 assigns earth coordinates for locator units 14 as a function of time. By using the satellite ID and time stamp data location parameters from the measurement record, and by applying conventional orbital geometry, task 134 may assign earth coordinates to the crude position.

In an alternate embodiment, the FOA curve 122 and TOA circle 126 may be translated directly into earth coordinates during tasks 120 and 124. Thus, the crude position obtained from procedure 132 would automatically be defined in terms of earth coordinates, and task 134 would not need to perform a translation.

The accuracy of the crude position selected through procedure 132 may or may not be sufficient for the purposes of system 10. Many factors may contribute to inaccuracies. For example, the specific designs used in locator units 14 and locatable units 24 contribute to the degree of accuracy with which the crude position defines an actual location for locatable unit 24. The accuracy with which Doppler component, propagation duration, and real time can be measured contributes to the accuracy of the location parameters upon which the crude position is based. These factors are, for the most part, random errors that can be expressed through standard deviations or other statistical variance terms. Such variance terms are substantially constant from measurement record to measurement record. They may be determined mathematically from design parameters for locatable unit 24 and locator unit 14, or they may be determined empirically.

Other accuracy factors relate to the nature of FOA and TOA curves 122 and 126, shown in FIG. 8. Referring briefly to FIG. 8, at locations where FOA hyperbolas 122 intersect TOA circles 126 at nearly right angles, small errors in Doppler component or propagation duration measurements result in small geographic location errors. These locations are found further away from the point where the locator unit's nadir direction intersects the surface of the earth, particularly to the left and right of ground track 36. The more tangential the FOA hyperbolas are to an intersecting TOA circle, the greater the geolocation error which results from small measurement errors. Moreover, the error is typically greater in a direction perpendicular to ground track 36 than in a direction parallel to ground track 36. These factors vary in accordance with the position of locatable unit 24 relative to locator unit 14. Together, all the accuracy factors suggest that the crude position probably does not describe the actual location for locatable unit 24, but that the actual location resides somewhere close to the crude position.

Referring back to FIG. 7, location processor 70 may make more than one crude position determination for any locatable unit 24 before concluding that sufficient accuracy has been achieved. Additional location determinations are performed through repetitions or reactivations of location processor 70 to process additional measurement records constructed for the same locatable unit 24.

Thus, location processor 70 may perform a task 138 to average or otherwise combine the crude position obtained above in task 134 for the current repetition of location processor 70 with any prior crude positions obtained in prior repetitions of location processor 70. The averaging of crude positions determined from a plurality of location parameter sets refines the definition of the crude position and further reduces inaccuracies associated with the crude position. Of course, those skilled in the art will appreciate that such averaging may alternatively take place above in task 120, task 124, and procedure 132 as well. The averaging of results from additional iterations of the location process causes the location accuracy to improve in a manner well known to those skilled in the art.

By averaging a plurality of crude positions obtained from a plurality of location parameter sets, those skilled in the art will appreciate that a wide variety of "averaging" techniques are contemplated by the present invention. For example, the preferred embodiments average crude positions through the use of well known minimum least squares error or maximum likelihood curve fitting techniques. However, those skilled in the art may devise other averaging techniques to cause a plurality of error-prone location parameter measurements to converge on a solution for the actual location of locatable unit 24.

After task 138, a task 140 obtains an error estimate or definition to associate with the crude position determined so far by location processor 70. This error definition is a function of the current crude position relative to locator unit 14, the variance terms that characterize the location parameters, and the number of location parameter measurements processed by various repetitions of location processor 70. The error definition resembles an ellipse (not shown). This error ellipse is centered at the crude position. At positions relative to locator unit 14 where error is minimal, the ellipse is more circular and covers a relatively small area. At positions relative to locator unit 14 where error is greater, the ellipse's area increases and its shape becomes more flattened, with a major axis extending perpendicular to the ground track 36. The error definition may be obtained by a table look-up operation using data describing the relative location of the crude position to locator unit 14 and the number of location parameter sets that have been averaged to result in a current, more refined, crude position.

After task 140, a task 142 compares the error definition with a predetermined position accuracy requirement. The position accuracy error is determined by system constraints. Position accuracy may be defined as a circle, such as a circular error probability (CEP), centered at the crude position, and having a radius of a predetermined distance. Task 142 compares the area of the error definition ellipse with the area of the position accuracy circle.

Next, a query task 144 determines whether the error is less than the position accuracy. The error is less if a predetermined percentage of the area of the error ellipse fits within the position accuracy circle. However, other statistical curve-fitting techniques may be applied as well. Thus, task 144 decides whether to further refine the definition of the crude position. Further refinement is needed unless the area of the error ellipse is sufficiently confined within the position accuracy circle.

If the error is not less than the allowable error, a task 146 saves the current location and crude position parameters for averaging with future measurements in a future iteration of location processor 70 with respect to the locatable unit 24. Next, a task 148 sends a message to locator unit measurement processor 68 (see FIG. 6) to instruct it to cooperate with locatable unit measurement processor 66 in taking additional measurements and to return another measurement record. After task 148, program control exits location processor 70, and location processor 70 becomes temporarily inactive with respect to the locatable unit 24 and this location determination. However, when the next measurement record is received for the locatable unit 24 at the node 48 where location processor 70 resides, location processor 70 reactivates. As discussed above, location processor 70 will refine the definition of the crude position through a curve-fitting statistical averaging technique. This refinement will cause the area of the error ellipse to shrink while slightly altering the definition of the crude position.

At some future iteration of location processor 70 with respect to locatable unit 24 the error ellipse will shrink to a point where task 144 will determine that the error is less than the position accuracy. At this point, system 10 requires no further refinement of the crude position. Thus, a task 150 sends the crude position to service processor 72 (see FIG. 10), discussed below, in a location-determined message. At this point, this location determination is complete, the crude position is now considered as the location for locatable unit 24, and program control exits. Location processor 70 again becomes inactive. However, location processor 70 reactivates for other location determinations, whether for this or other locatable units 24.

Figure 9:
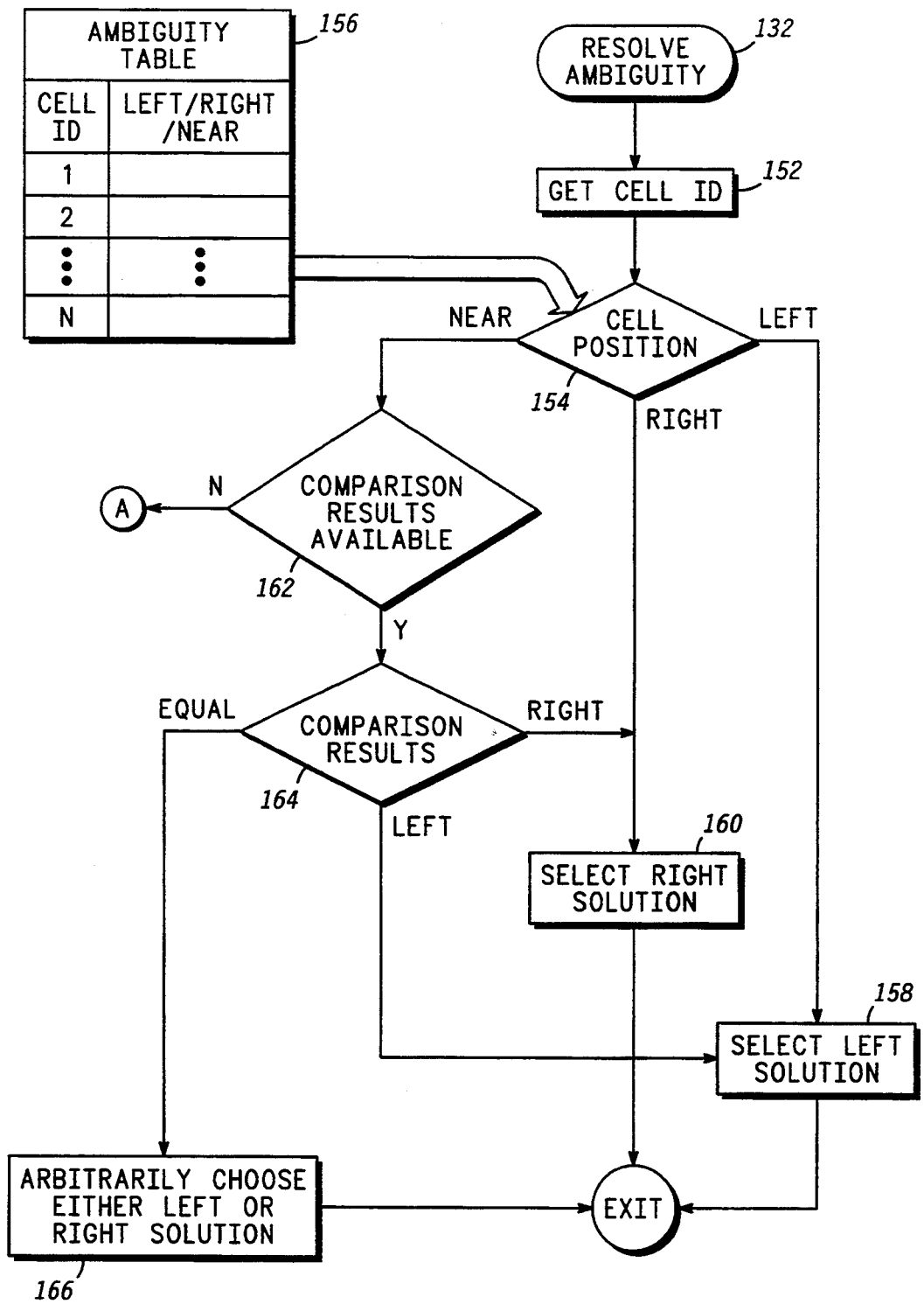
FIG. 9 shows a flow chart of tasks performed by a resolve ambiguity procedure performed by the location processor portion of the radio telecommunications/location system.

As discussed above, procedure 132 resolves the ambiguity posed by the intersection of an FOA curve 122 with a TOA curve 126. FIG. 9 shows a flow chart of tasks performed by location processor 70 during procedure 132 to select one of two solutions that are equally credible based upon FOA and TOA curves alone. Procedure 132 may perform a task 152 to get a cell ID from the measurement record. This cell ID identifies the beam 33 through which communications were conducted in accordance with measurement processors 66 and 68 (see FIGS. 5–6). With reference back to FIGS. 2 and 3, each of cells 34 projected through beams 33 by satellite 14 has a unique ID associated with it. A first portion of these cells 34 resides to the far right of ground track 36, a second portion of these cells 34 resides to the far left of ground track 36, and a third portion of these cells 34 resides either near or over ground track 36.

Referring back to FIG. 9, after task 152 obtains a cell ID, a query task 154 determines the position of the cell relative to ground track 36. Task 154 may consult an ambiguity table 156, a block diagram of which is shown in FIG. 9, to make this determination. Table 156 is constructed to associate far-left-of-ground-track, far-right-of-ground-track, and near/over-ground-track status indications with each beam's cell 34 included in a footprint 30 (see FIGS. 2–3). Table 156 may be stored in memory 58 (see FIG. 4) of the node 48 (see FIG. 4) within which location processor 70 resides. Using the cell ID included in the measurement record, task 154 can look up a far left, far right, or near/over status indication in table 156. While the distinction between determining which beams 33 are projected far from ground track 36, near to ground track 36, and over ground track 36 is somewhat arbitrary, the same definition for near/over and far cells used in beam status table 86 (see FIG. 5) is used in ambiguity table 156.

With the status indication from table 156, procedure 132 performs a task 158 when the cell's ID indicates communications took place through a beam 33 projected far to the left of ground track 36 and a task 160 when communications took place through a beam 33 far to the right of ground track 36. As discussed above, FOA curves 122 (see FIG. 8) are generally symmetrical about ground track 36. Thus, one solution resides to the left of ground track 36 and the other solution resides to the right of ground track 36. Consequently, task 158 causes procedure 132 and location processor 70 (see FIG. 7) to select the left solution, such as position 128 depicted in FIG. 8, as the actual position. Task 160 selects the right solution, such as position 130 depicted in FIG. 8, as the actual position. After tasks 158 or 160, program control exits procedure 132 and returns to task 134 in location processor 70 (see FIG. 7).

For situations where communications occur through beams 33 projected either far left or far right of ground track 36, the ambiguity is resolved quickly and with a minimal amount of processing. A majority of cells 34 reside either far to the left or right of ground track 36. Thus, for a majority of situations, ambiguity may be resolved quickly and easily.

On the other hand, in a minority of situations, communications occur in beams 33 projected over or near ground track 36. In these situations, each of the two solutions provided from the intersection of an FOA curve 122 (see FIG. 8) with a TOA curve 126 (see FIG. 8) resides either in a single common cell 34 or two adjacent cells 34. The closely spaced relationship between the two solutions results from the symmetry of FOA curves 122 (see FIG. 8) about ground track 36. When communications take place in cells 34 which are deemed to reside over ground track 36 or near ground track 36, cell ID does not provide sufficient resolution to reliably distinguish between an actual position and an image position.

Accordingly, when cell ID indicates that communications took place through a beam 33 projected near or over ground track 36, procedure 132 performs a query task 162. Task 162 determines whether the measurement record currently being processed by location processor 70 (see FIG. 7) and procedure 132 includes the comparison results discussed above in connection with tasks 106 (see FIG. 5) and 118 (see FIG. 6). When the current measurement record does not carry the comparison results, program control proceeds, through connector "A", to task 146 shown in FIG. 7. As discussed above, task 146 and the following task 148 cause the current location parameters to be saved for future use and cause measurement processors 66 and 68 (see FIGS. 5-6) to make additional measurements and return another measurement record. As discussed above in connection with task 118 (see FIG. 6) this subsequent measurement record should include the comparison results.

When task 162 discovers that the current measurement record includes the comparison results, a query task 164 evaluates the comparison results. As discussed above, the comparison results indicate whether a greater total power level or a greater total number of broadcast signals is received from left-of-ground-track beams 33 or from right-of-ground-track beams 33. In a very few situations, the comparison results may indicate equal preference toward left-of-ground-track beams 33 or right-of-ground-track beams 33.

When task 164 determines that comparison results indicate a preference for left-of-ground-track beams 33, program control proceeds to task 158 to select the left one of the two possible solutions and then exits procedure 132. When task 164 determines that comparison results indicate a preference for right-of-ground-track beams 33, program control proceeds to task 160 to select the right one of the two possible solutions and then exits procedure 132.

When task 164 determines that comparison results indicate an equal preference for left-of-ground-track beams 33 and right-of-ground-track beams 33, a task 166 arbitrarily chooses either the left or right solution. In theory, the equal preference situation occurs only when the actual and image positions are on top of each other and ground track 36. However, in actual practice where measurement errors, noise, and other factors contribute to errors and the decision of task 164 must rely on techniques such as statistacal inference or other well known techniques that deal with uncertainty. In this case the equal preference situation occurs when the actual and image positions are not on top of each other but very close to one another and to ground track 36. Such situations occur infrequently, and position error resulting from an incorrect selection in task 166 is small due to the close spacing between actual and image positions. After tasks 158, 160, or 166, program control exits procedure 132 and returns to task 134 in location processor 70 (see FIG. 7).

The processes and procedures discussed above in connection with FIGS. 7 and 9 may require additional measurement records to be obtained in various situations so that location processor 70 converges upon an acceptably accurate, unambiguous location solution in an iterative fashion. As discussed above, less error is associated with locations that reside further away from ground track 36 (see FIGS. 2, 3 and 8). Moreover, the likelihood of resolving ambiguity through cell IDs rather than from processing comparison results increases further away from ground track 36. Delay in resolving a location for locatable unit 14 due to comparison results not being immediately available in an original measurement record is unlikely. Delay is unlikely because the situations which are likely to require comparison results are also the ones which are likely to require additional measurements to achieve required position accuracy.

Figure 10:
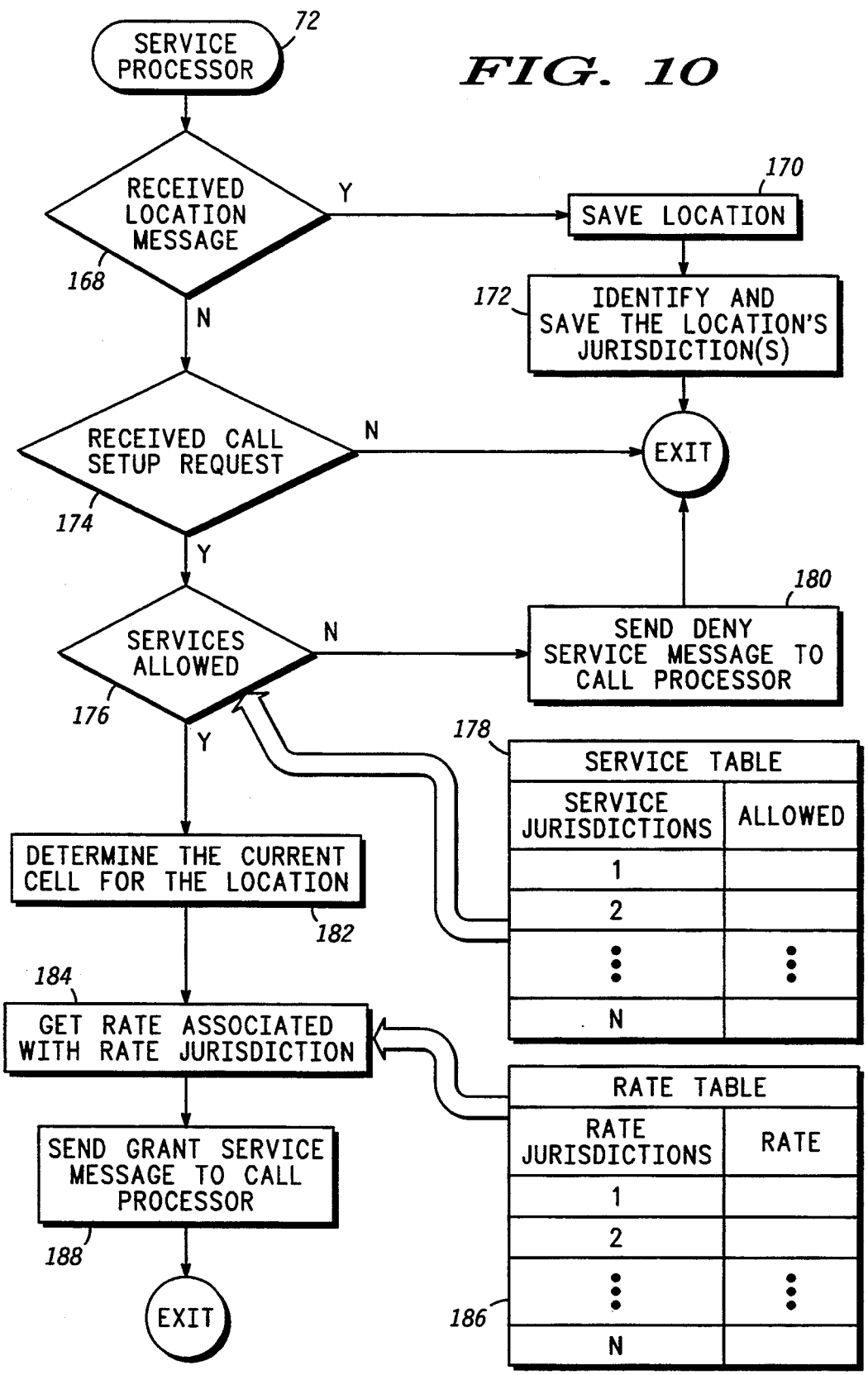
FIG. 10 shows a flow chart of tasks performed by a service processor portion of the radio telecommunications system.

FIG. 10 shows a flow chart of tasks performed by service processor 72. The preferred embodiment of the present invention implements a service processor 72 in each SIM 28 (see FIG. 1). In particular, the home SIM 28 for a locatable unit 24 implements service processor 72 for that locatable unit 24. However, those skilled in the art could adapt service processor 72 for implementation in any other node 48 (see FIG. 4) of system 10, or an independent node (not shown) can be established to implement a single service processor 72 for the entire system 10. Generally speaking, service processor 72 qualifies communication services provided by system 10 to the locatable unit 24 and its user in response to the locatable unit's location as indicated in the location-determined message prepared and sent in task 150 (see FIG. 7).

Radio telecommunications/location system 10 activates service processor 72 with respect to a single specific locatable unit 24 when a location-determined message relating to that locatable unit 24 is received at the node 48 within which service processor 72 resides. In addition, service processor 72 is activated when a message requesting a call setup involving that locatable unit 24 is received. This node 48 may be the same node 48 which implements location processor 70 (see FIG. 7), and the location-determined message may be delivered by placing the message in an appropriate queue being managed in memory 58 of that node 48.

In particular, service processor 72 performs a query task 168 to determine whether a location-determined message has been received. If a location-determined message has been received, a task 170 saves she location data contained in the message in association with the locatable unit 24 to which the location relates. After task 170, a task 172 identifies all relevant jurisdictions, discussed above in connection with FIG. 2, within whose domains the location resides. The jurisdictions may be geopolitical jurisdictions, rate jurisdictions, feature jurisdictions, and the like. When the jurisdictions are identified, IDs associated with the relevant jurisdictions are saved in association with the locatable unit 24 to which the location relates for future use by service processor 72. After task 172, program control exits service processor 72, and service processor 72 becomes inactive. However, service processor 72 will activate again with respect to this locatable unit 24 when a call setup involving this locatable unit 24 is requested.

A subsequent activation of service processor 72 may be detected when task 168 determines that a location message has not been received. In this situation, a query task 174 determines whether a call setup request message has been received at service processor 72 with respect to the locatable unit 24. The call setup request message is received when someone is attempting to setup a call involving the locatable unit 24. The locatable unit 24 may be either a calling party or a called party. If a call setup request message has not been received, program control exits service processor 72, and service processor 72 becomes inactive.

When a call setup request message is received, a query task 176 determines whether communication services are allowed for the locatable unit 24. In deciding whether communication services are allowed for the locatable unit 24, task 176 may consult a service table 178 stored in memory 58 of the node 48 which implements service processor 72. Service table 178 associates service jurisdictions with indications of whether communication services are allowed or not. The service jurisdictions may, for example, be geopolitical jurisdictions. These jurisdictions were identified above in connection with task 172.

If communication services are not allowed, a task 180 is performed to send a deny service message to the call processor (not shown) which sent the call setup request message to service processor 72. The call processor will take appropriate steps to realize the qualification to communication services indicated by task 180. After task 180, program control exits service processor 72, and service processor 172 becomes inactive.

If task 176 determines that communication services are allowed, a task 182 determines the current locator unit 14 and cell 34 that cover the location saved above in task 170 for this locatable unit 24 during a previous activation of service processor 72. This locator unit 14 and cell 34 may be different from the locator unit 14 and cell 34 which were involved in location determination, discussed above, due to the movement of locator units 14. This determination may be made by applying the current time and the location saved above in task 170 to the orbital geometry associated with constellation 12 (see FIG. 1) of locator units 14.

After task 182, a task 184 gets a call rate to be used for the upcoming call. Task 184 may consult a rate table 186 stored in memory 58 of the node 48 which implements service processor 72. Rate table 186 associates rate jurisdictions with rate descriptions. Any rate description conventional in the art of telephony is contemplated for rate table 186. Such rate descriptions may be complex formulas which vary rates depending on time of day, direction of call, number of minutes over which a call takes place, and the like. These rate jurisdictions were identified above in connection with task 172. They may or may not correspond to the service jurisdictions discussed above in connection with task 176.

After task 184, a task 188 sends a grant service message to the call processor (not shown) that sent the call setup request message to service processor 72. In addition, if locatable unit 24 is the called party, task 188 may send the grant service message to a call processor (not shown) that is serving locatable unit 24. This called-party call processor may be identified by the location information saved in task 170 or by a jurisdiction identified above in task 172.

The grant service message will include the cell ID, and rate data determined above in tasks 182 and 184. The call processor will continue setting up the requested call in a manner consistent with conventional telephony techniques. The communication services provided by system 10 throughout the call will be qualified through the rate data included in the grant service message. After task 188, the communication services to be offered for the call have been qualified in response to the locatable unit's location, and program control exits service processor 72. Service processor 72 again becomes inactive. However, service processor 72 reactivates for other location-determined messages or other call setup request messages, whether for this or other locatable units 24. While the service processor 72 discussed above qualifies communication services based on a locatable unit's location, nothing prevents other processors from qualifying communication services based on other factors, such as payment of accounts. Alternatively, service processor 72 may be expanded to qualify communication services based on such other factors as well as an SU's location.

In summary, the present invention provides an improved location determination system and method which are suitable for use in a radio telecommunications system. The system and method of the present invention automatically determine locations for locatable subscriber units. A subscriber unit's location is determined using a locator satellite which orbits the earth in a low earth orbit. No more than one satellite is needed to determine a subscriber unit's location. Moreover, the low earth orbit is advantageous for communications because lower power subscriber units may be used and spectrum may be reused more efficiently.

The location system of the present invention uses a multibeam antenna for engaging in communications with respect to a plurality of signals. Signals associated with various beams from the multibeam antenna are processed to select actual positions for subscriber units. Actual positions may be distinguished from image positions by identifying the single beam through which communications take place or by comparing signals received through various antenna beams projected on opposing sides of a distinguishing line of symmetry.

The present invention has been described above with reference to preferred embodiments. However, those skilled in the art will recognize that: changes and modifications may be made in these preferred embodiments without departing from the scope of the present invention. For example, those skilled in the art will appreciate that the flow charts presented herein are intended to teach the present invention and that different techniques for implementing program flow that do not necessarily lend themselves to flowcharting may be devised. In particular, each task discussed herein may be interrupted to permit program flow to perform background or other tasks. In addition, the specific order of tasks may be changed, and the specific techniques used to implement the tasks may differ from system to system. These and other changes and modifications which are obvious to those skilled in the art are intended to be included within the scope of the present invention.

What is claimed is:

1. A method of distinguishing an actual position from an image position in a location determination system, said actual position being identified from first and second positions symmetrically located about a distinguishing line, and said method comprising the steps of:
   projecting a plurality of antenna beams in a plurality of diverse directions, wherein a first portion of said beams project on a first side of said distinguishing line and a second portion of said beams project on a second side of said distinguishing line;
   receiving a signal transmitted through one of said beams; and
   selecting, as said actual position, the one of said first and second positions which resides on the same side of said distinguishing line as the beam through which said signal was received.

2. A method of distinguishing an actual position from an image position as claimed in claim 1 additionally comprising the steps of:
   associating status indications with identities for said beams, said status indications specifying whether said beams reside on said first side of said distinguishing line or on said second side of said distinguishing line; and
   identifying, after said receiving step, the one of said beams through which said signal was received.

3. A method of distinguishing an actual position from an image position as claimed in claim 1 additionally comprising the steps of:
   placing a satellite in orbit around the earth; and
   configuring said satellite to perform said projecting step.

4. A method of distinguishing an actual position from an image position as claimed in claim 1 wherein:
   said receiving step receives a plurality of signals transmitted through a plurality of said beams; and
   said method additionally comprises the step of comparing the ones of said plurality of signals which are received through beams projected on said first side of said distinguishing line with the ones of said plurality of signals which are received through beams projected on said second side of said distinguishing line.

5. A method of distinguishing an actual position from an image position as claimed in claim 4 wherein said method additionally comprises the steps of:
   determining the strength of each of said plurality of signals received in said receiving step;
   calculating a first cumulative signal strength that is responsive to the strengths of the ones of said plurality of signals which are received through beams projected on said first side of said distinguishing line;
   calculating a second cumulative signal strength that is responsive to the strengths of the ones of said plurality of signals which are received through beams projected on said second side of said distinguishing line; and
   said comparing step comparing said first cumulative signal strength to said second cumulative signal strength.

6. A method of distinguishing an actual position from an image position as claimed in claim 5 wherein:
   said determining step comprises the step of determining the power level for each of said plurality of signals received in said receiving step;
   said first cumulative signal strength calculating step comprises the step of adding together said power levels for the ones of said plurality of signals which are received through beams projected on said first side of said distinguishing line;
   said second cumulative signal strength calculating step comprises the step of adding together said power levels for the ones of said plurality of signals which are received through beams projected on said second side of said distinguishing line; and
   said cumulative signal strength comparing step comprises the step of determining which of said first and second cumulative signal strengths is greater.

7. A method of distinguishing an actual position from an image position as claimed in claim 4 wherein said comparing step comprises the step of comparing the number of said signals which are received through beams projected on said first side of said distinguishing line with the number of said signals which are received through beams projected on said second side of said distinguishing line.

8. A method of distinguishing an actual position from an image position as claimed in claim 4 wherein:
   a first locator unit projects said plurality of beams;
   a second locator unit projects a second plurality of beams, said second plurality of beams each having a signal transmitted therethrough; and
   said comparing step comprises the steps of responding to signals transmitted through said plurality of beams projected by said first locator unit and ignoring signals transmitted through said second plurality of beams projected by said second locator unit.

9. A method of distinguishing an actual position from an image position as claimed in claim 4 wherein a locator unit includes an antenna which performs said projecting step, said first and second positions describe possible locations for a locatable unit, said locator and locatable units move relative to one another, and said method additionally comprises the steps of:
   transmitting, through each of said plurality of beams, one of said signals from one of said locator unit and said locatable unit to the other of said locator and locatable units;

determining a Doppler component of one of said signals; and determining said first and second positions in response to said Doppler component.

10. A method of distinguishing an actual position from an image position as claimed in claim 9 wherein:
said locator unit and said locatable unit are spaced apart from one another;
said method additionally comprises the step of determining a duration required for one of said signals to propagate between said locator and locatable units; and
said determining first and second positions step determines said first and second positions in response to said Doppler component and said propagation duration.

11. A method of operating a radio telecommunications system having a satellite moving in an orbit around the earth and having a subscriber unit located proximate the earth's surface, said method comprising the steps of:
projecting a plurality of antenna beams in a plurality of diverse directions from said satellite, wherein a first portion of said beams project on a first side of a ground track for said satellite and a second portion of said beams project on a second side of said ground track;
receiving, at one of said satellite and said subscriber unit, a signal transmitted through one of said beams;
obtaining a set of location parameters which describe first and second possible positions of said subscriber unit;
selecting, as an actual position for said subscriber unit, the one of said first and second possible positions which resides on the same side of said ground track as the beam through which said signal was received; and
qualifying communication services provided for said subscriber unit in response to said actual position for said subscriber unit.

12. A method of operating a radio telecommunications system as claimed in claim 11 additionally comprising the steps of:
associating status indications with identities for said beams, said status indications specifying whether said beams reside on said first side of said ground track or on said second side of said ground track; and
identifying, after said receiving step, the one of said beams through which said signal was received.

13. A method of operating a radio telecommunications system as claimed in claim 11 wherein:
said receiving step receives a plurality of signals transmitted through a plurality of said beams; and
said method additionally comprises the step of comparing the ones of said plurality of signals which are received through beams projected on said first side of said ground track with the ones of said plurality of signals which are received through beams projected on said second side of said ground track.

14. A method of operating a radio telecommunications system as claimed in claim 13 wherein said method additionally comprises the steps of:
determining a power level for each of said plurality of signals received in said receiving step;
calculating a first cumulative signal strength that is responsive to the power levels of the ones of said plurality of signals which are received through beams projected on said first side of said ground track;
calculating a second cumulative signal strength that is responsive to the power levels of the ones of said plurality of signals which are received through beams projected on said second side of said ground track; and
said comparing step comparing said first cumulative signal strength to said second cumulative signal strength.

15. A method of operating a radio telecommunications system as claimed in claim 13 wherein said comparing step comprises the step of comparing the number of said signals which are received through beams projected on said first side of said ground track with the number of said signals which are received through beams projected on said second side of said ground track.

16. A method of operating a radio telecommunications system as claimed in claim 13 wherein:
said satellite projects said plurality of beams;
a second satellite projects a second plurality of beams, said second plurality of beams each having a signal transmitted therethrough so that at least one of said signals transmitted through said second plurality of beams is receivable at said subscriber unit; and
said comparing step comprises the steps of responding to signals transmitted through said plurality of beams projected by said satellite and ignoring signals transmitted through said second plurality of beams projected by said second satellite.

17. A method of operating a radio telecommunications system as claimed in claim 11 wherein:
said obtaining step comprises the steps of:
transmitting one or more electromagnetic signals from one of said satellite and said subscriber unit to the other of said satellite and said subscriber unit,
determining a Doppler component of said one or more signals, and
determining a duration required for said one or more signals to propagate between said satellite and said subscriber unit; and
said method additionally comprises the step of determining said first and second positions in response to said Doppler component and said propagation duration.

18. A location determination system comprising:
at least one locator unit moving in an orbit around the earth, said movement causing a nadir direction of said locator unit to intersect the earth along a ground track for said locator unit, and said locator unit projecting a first plurality of beams toward the earth on a first side of said ground track and a second plurality of beams toward the earth on a second side of said ground track;
at least one locatable unit residing proximate the earth's surface;
a measurement processor residing in one of said locator and locatable units, said measurement processor being configured to determine a Doppler component of an electromagnetic signal traveling between said locator and locatable units; and
a location processor in data communication with said measurement processor, said location processor being configured to determine two positions for said locatable unit in response to said Doppler component, and said location processor comprising means for determining whether said electromagnetic signal was communicated through one of said first plurality of beams or through one of said second plurality of beams.

19. A location determination system as claimed in claim 18 wherein an electromagnetic signal travels between said locator and locatable units through each of said beams, and said measurement processor comprises:
   means for receiving a plurality of said signals; and
   means, coupled to said receiving means, for comparing the ones of said plurality of signals which are received through beams projected on said first side of said ground track with the ones of said plurality of signals which are received through beams projected on said second side of said ground track.

20. A location determination system as claimed in claim 19 wherein said comparing means comprises:
   means for determining a power lever for each of said plurality of signals received by said receiving means;
   means, coupled to said determining means, for calculating a first cumulative signal strength that is responsive to the power levels of the ones of said plurality of signals which are received through beams projected on said first side of said ground track and for calculating a second cumulative signal strength that is responsive the power levels of the ones of said plurality of signals which are received through beams projected on said second side of said ground track; and
   means, coupled to said calculating means, for comparing said first cumulative signal strength to said second cumulative signal strength.

* * * * *